May 6, 1958 P. E. BESSIERE 2,833,888

CIRCUIT BREAKERS

Filed Feb. 14, 1957 8 Sheets-Sheet 1

INVENTOR

Pierre Etienne Bessiere

BY

Bailey Stephens & Huettig

ATTORNEYS

INVENTOR
Pierre Etienne Bessiere
BY
Bailey Stephens & Huettig
ATTORNEYS

INVENTOR
Pierre Etienne Bessiere
BY
Bailey Stephens & Huettig
ATTORNEYS

INVENTOR
Pierre Etienne Bessiere
BY
Bailey Stephens & Huettig
ATTORNEYS

May 6, 1958 P. E. BESSIERE 2,833,888

CIRCUIT BREAKERS

Filed Feb. 14, 1957 8 Sheets-Sheet 5

INVENTOR
Pierre Etienne Bessiere
BY
Bailey, Stephens & Huettig
ATTORNEYS

INVENTOR
Pierre Etienne Bessiere
BY
Bailey, Stephens & Huettig
ATTORNEYS

INVENTOR
Pierre Etienne Bessiere
BY
Bailey, Stephens and Huettig
ATTORNEYS

INVENTOR
Pierre Etienne Bessiere
BY
Bailey, Stephens and Huettig
ATTORNEYS

United States Patent Office 2,833,888
Patented May 6, 1958

2,833,888

CIRCUIT BREAKERS

Pierre Etienne Bessière, Paris, France, assignor to Etablissements Labinal, Saint-Ouen (Seine), France, a society of France Application February 14, 1957, Serial No. 640,231

Claims priority, application France February 18, 1956

9 Claims. (Cl. 200—116)

The present invention relates to circuit-breakers, that is to say apparatus intended to open a circuit automatically when the current in this circuit rises in excess of a predetermined value.

The object of my invention is to provide a circuit-breaker which is better adapted to meet the requirements of practice than those known at the present time.

The principle of my invention consists in controlling the resetting of the circuit-breaker by means of a lever the axis of which may be given a translatory displacement in a direction substantially at right angles to itself, said lever remaining constantly free to rotate about said axis.

Preferred embodiments of my invention will be hereinafter described with reference to the accompanying drawings, given merely by way of example and in which.

Figs. 8 to 11 inclusive are elevational views of different forms of an element of the circuit-breaker, according to my invention.

Figures 8, 9, 10, 11, 12, 13, 14:
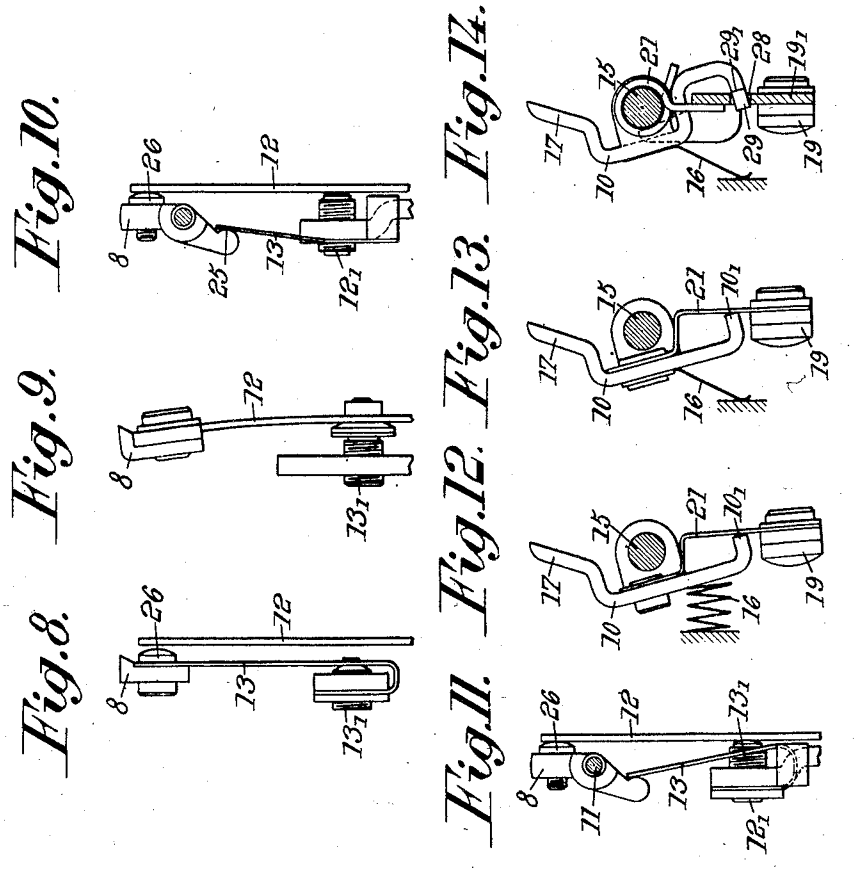

Figs. 12 to 14 are elevational views of different forms of another element of the circuit-breaker according to my invention.

Figure 15:
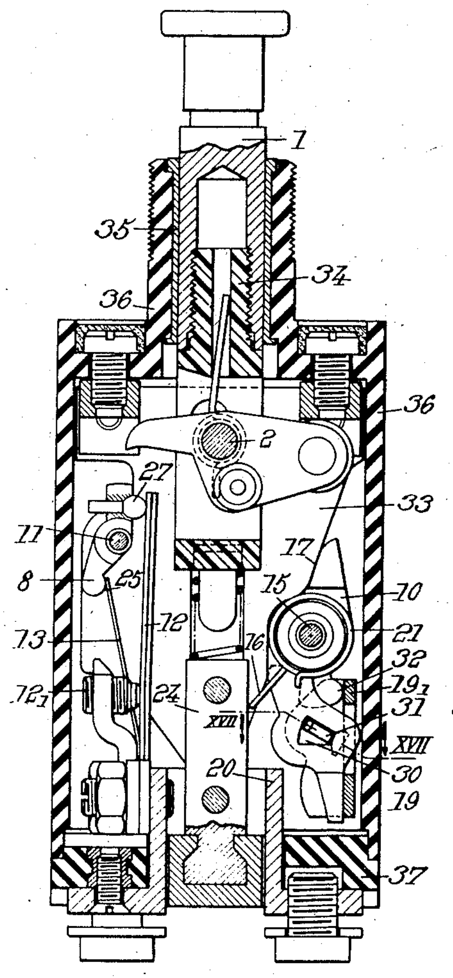
Figure 18:
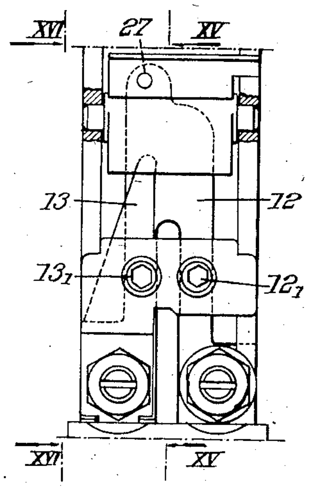

Fig. 15 is a vertical sectional view on the line XV—XV of Fig. 18 of another embodiment of the circuit-breaker made according to my invention.

Figure 16:
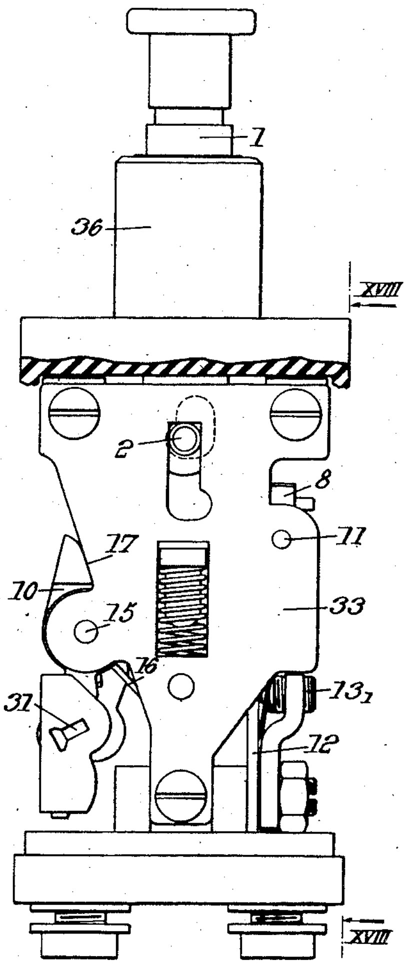

Fig. 16 is an elevational view of the circuit-breaker of Fig. 15, the casing of this circuit-breaker being removed.

Figure 17:
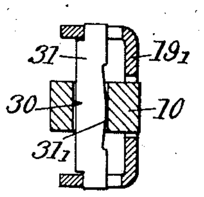

Fig. 17 is a part sectional view on the line XVII—XVII of Fig. 15.

Fig. 18 is a cross sectional view, with the casing removed, on the line XVIII—XVIII of Fig. 16.

Figure 19:
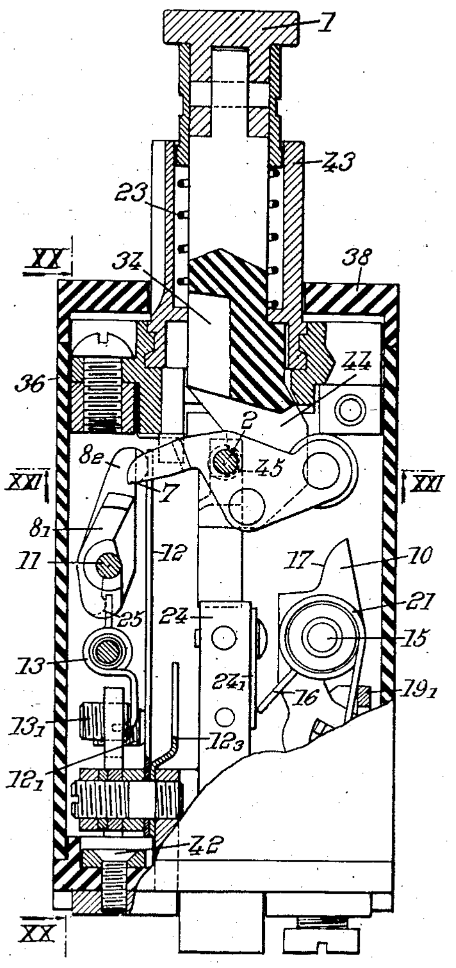
Figure 20:
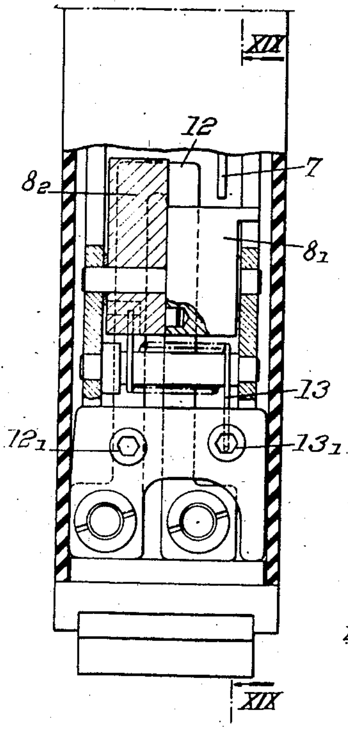

Fig. 19 is a part vertical sectional view on the line XIX—XIX of Fig. 20.

Fig. 20 is a sectional view with the casing removed, on the line XX—XX of Fig. 19.

Figure 21:
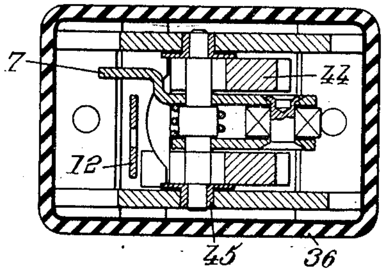

Fig. 21 is a sectional view seen from bottom on the line XXI—XXI of Fig. 19.

Figure 22:
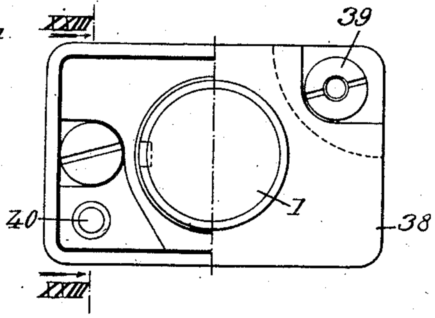

Fig. 22 is a plan view with the casing partly removed of the circuit-breaker of Fig. 19.

Figure 23:
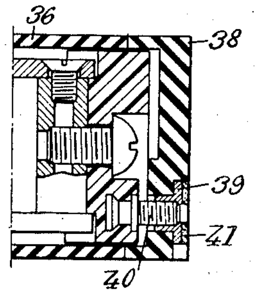

Fig. 23 is a vertical sectional view on the line XXIII—XXIII of Fig. 22.

Figure 24:
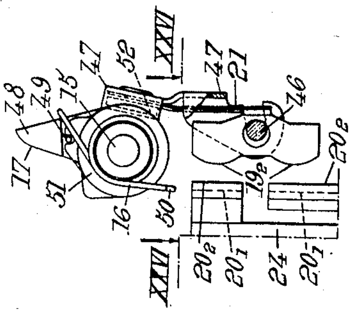

Fig. 24 is an elevational view of still another embodiment of the contacts and of the supporting part of a circuit-breaker made according to still another embodiment.

Figure 25:
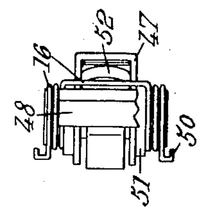

Fig. 25 is a corresponding plan view with parts cut away.

Figure 26:
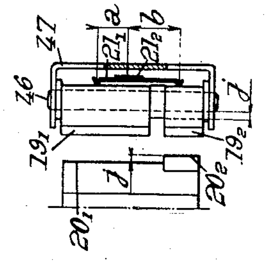

Fig. 26 is a sectional view on the line XXVI—XXVI of Fig. 24.

Figure 28:
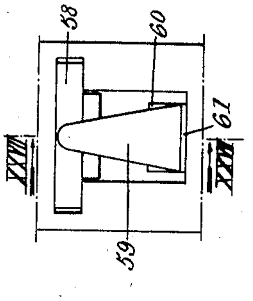
Figure 27:
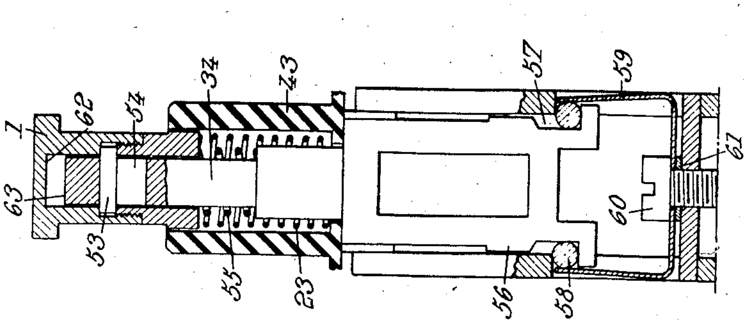

Fig. 27 is a vertical sectional view on the line XXVII—XXVII of Fig. 28 showing a mechanism for quick release of the circuit-breaker.

Fig. 28 is a part elevational view corresponding to Fig. 27.

Figure 29:
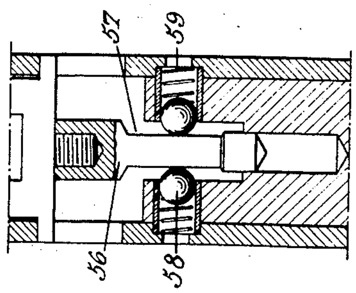

Fig. 29 is a part sectional view of a modification of such a mechanism.

Figure 30:
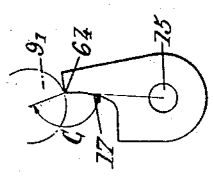

Fig. 30 shows a modification of a portion of the contact supporting means.

The apparatus according to my invention is arranged in such manner that the forces applied when the circuit-breaker is reset are exerted by the operator upon a lever exclusively through the pivot axle thereof, this lever being free to rotate about the axis of said axle whatever be the value of these forces.

Such an arrangement facilitates free tripping of the circuit-breaker, that is to say, in the case of a current exceeding a predetermined value, automatic opening of the circuit as soon as the contacts have been closed by a resetting operation, even if the operator keeps acting upon the control member and for instance holds his finger on a push-button.

Thus, in Figs. 1 to 6, a control member 1 such as a push-button is used to displace the pivot axle 2 of a lever 3 the functions of which will be more explicitly referred to hereinafter.

Concerning the control of the displacements of said pivot axle 2, this axle is advantageously mounted slidable with a translatory motion in two grooves of a width substantially equal to the diameter of said axle, one of said grooves being fixed and the other movable, and said grooves being capable of cooperating for guiding said axle.

For the sake of clarity, I will include under the term of "groove," also the case of two or more grooves provided in different elements located opposite each other, such as the walls of a hollow button or two parallel plates.

The movable groove 4 (Figs. 1 and 2) provided in control member 1 is given a shape substantially elongated in the direction perpendicular to the displacements of this member; and the fixed groove 5 which is provided in the frame 6 of the apparatus is given the shape of an L, that is to say is elongated in the direction of said displacements and provided at one of its ends with a notch 6 substantially perpendicular to this direction.

I might of course utilize, within the scope of my invention, any suitable control member such as a lever, a handle, etc., but it is preferable to make use of a button which may be either pushed or pulled easily in a longitudinal direction.

Groove 4 is then substantially transverse and groove 5 has the longer branch of the L it forms longitudinally disposed.

When button 1 is displaced, the transverse groove 4 provided therein imparts a longitudinal movement to the axle 2 of lever 3 which thus slides along the longitudinal portion of groove 5.

When, in the course of its movement, said axle comes opposite the notch 6 formed by the horizontal branch of the fixed L-shaped groove, the action of suitable resilient means tends to introduce it into said notch, thus performing a kind of locking action.

The grooves used to guide the displacements of the lever pivot axle might be given shapes differing from those above stated.

In particular, it is advantageous to provide in the movable control member a groove parallel to the direction of the displacement thereof and which opens into the above mentioned groove 4, at the end thereof where is located the notch 6 of the fixed groove, thus forming a substantially L-shaped movable groove. The two L-shaped grooves, i. e. the fixed one and the movable one, have their longer branches parallel to each other and extending in the same direction and their shorter branches parallel and extending in opposed directions.

Such an arrangement permits a slight displacement of the control member beyond the position for which axle 2 is caught in notch 6, whereby the operation of the apparatus is made smoother.

I might also control and guide the displacements of said axle through means other than grooves, such as forks cooperating with cams or any other suitable system.

Concerning the lever itself and the means adapted to cooperate therewith when the apparatus is reset and made to trip, they are preferably made as follows.

Said lever 3 has one of its ends 7 constituted by a nose capable of cooperating with an abutment 8 retractable when the current in the circuit exceeds a predetermined value, the other end 9 of said lever being adapted to move, in particular through a roller $9_1$ freely rotatable thereon, upon a part 10 which operates the contacts.

In particular, said lever 3 may be constituted by two parallel plates assembled together and between which roller $9_1$ is journalled, resilient return means such as a torsional spring $2_1$ being mounted about axle 2 and bearing upon abutments $2_2$, $2_3$.

The abutment member 8 is pivoted about a fixed axis 11 parallel to the axis of the lever pivot axle and advantageously its surface intended to cooperate with the nose 7 of lever 3 is given a smooth cylindrical shape concentric with said axis 11. The force exerted by lever 3 on said abutment member therefore passes constantly through said axis 11, which avoids the creation of any disturbing couple of forces when the circuit-breaker is tripped into circuit opening position.

The displacements of this abutment member are controlled through means responsive to the occurrence of a current above a predetermined value in the circuit, such means being for instance constituted by an electromagnet or a bimetallic strip (such a strip being shown at 12).

I provide resilient return means, such as a plate spring 13 adjustable by means of a screw $13_1$, to urge abutment member 8 toward its position of rest, and an element 14 for limiting the displacements of said member.

Advantageously, the part 10 which actuates the contacts is constituted by a lever pivoted about a fixed axis 15 parallel to the axis of the pivot axle 2 of lever 3 and subjected to the action of resilient return means such as a helical compression spring 16.

The arm of this lever 10 which is to cooperate with the end 9 (or rather roller $9_1$) of lever 3 carries a cam which is advantageously a flexible cam, such as a resilient U-shaped plate 17 the shape of which is adjustable by means of a screw 18 carried by the above mentioned lever arm.

On the other arm of lever 10, I mount in resilient fashion one or several movable contacts 19 capable of cooperating with corresponding fixed contacts 20 and, therefore, of opening or closing an electric circuit. Such a resilient mounting is for instance obtained by controlling through a plate spring 21 the sliding displacements (Fig. 2) or pivoting displacements (Fig. 5) of the movable contacts.

The relative positions of the three above mentioned oscillation axes, to wit the axle 2 of lever 3, the axis 11 of the abutment member and the axis 15 of the contact carrying lever are accurately determined by placing them in orifices provided for this purpose in two side plates 22 (Figs. 4 and 6) identical and parallel and which constitute the rigid frame of the mechanism. Thus all the moving parts have exactly determined relative positions.

The above mentioned fixed grooves 5 are advantageously provided in said side plates 22.

I further provide relatively powerful resilient means to urge the control member toward its position of rest, in particular a helical compression spring 23 bearing on the one hand upon a fixed rigid support 24 and on the other hand upon push-button 1 so as to oppose the downward movement thereof.

Said rigid support 24, made of relatively small dimensions, is advantageously used as a bracing member used for assembling side plates 22 together and as a support for the fixed contacts 20 and the bimetallic strip 12.

Figure 7:
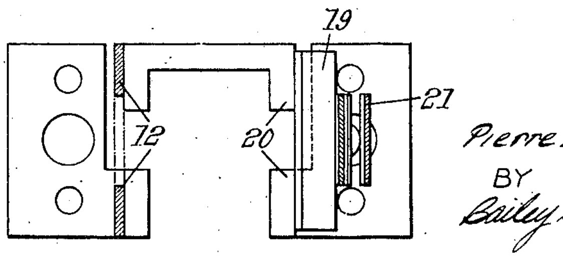
Fig. 7 is a sectional view on the line VII—VII of Fig. 5.

Fig. 7 shows the arrangement of the conductor and contact elements of the circuit-breaker.

Figure 1:
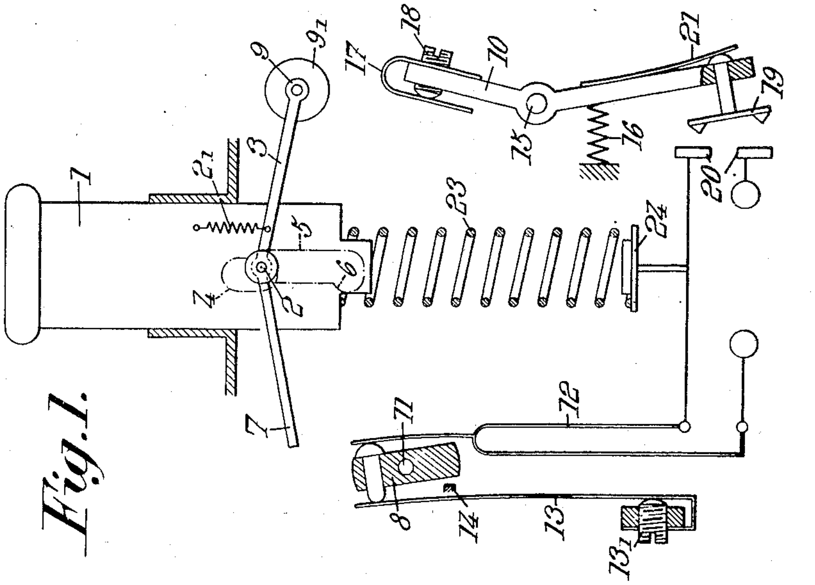
Fig. 1 is a diagrammatical view showing the main elements of a circuit-breaker made according to my invention, said circuit-breaker being shown in the position where the circuit is opened.
Figures 3, 4:
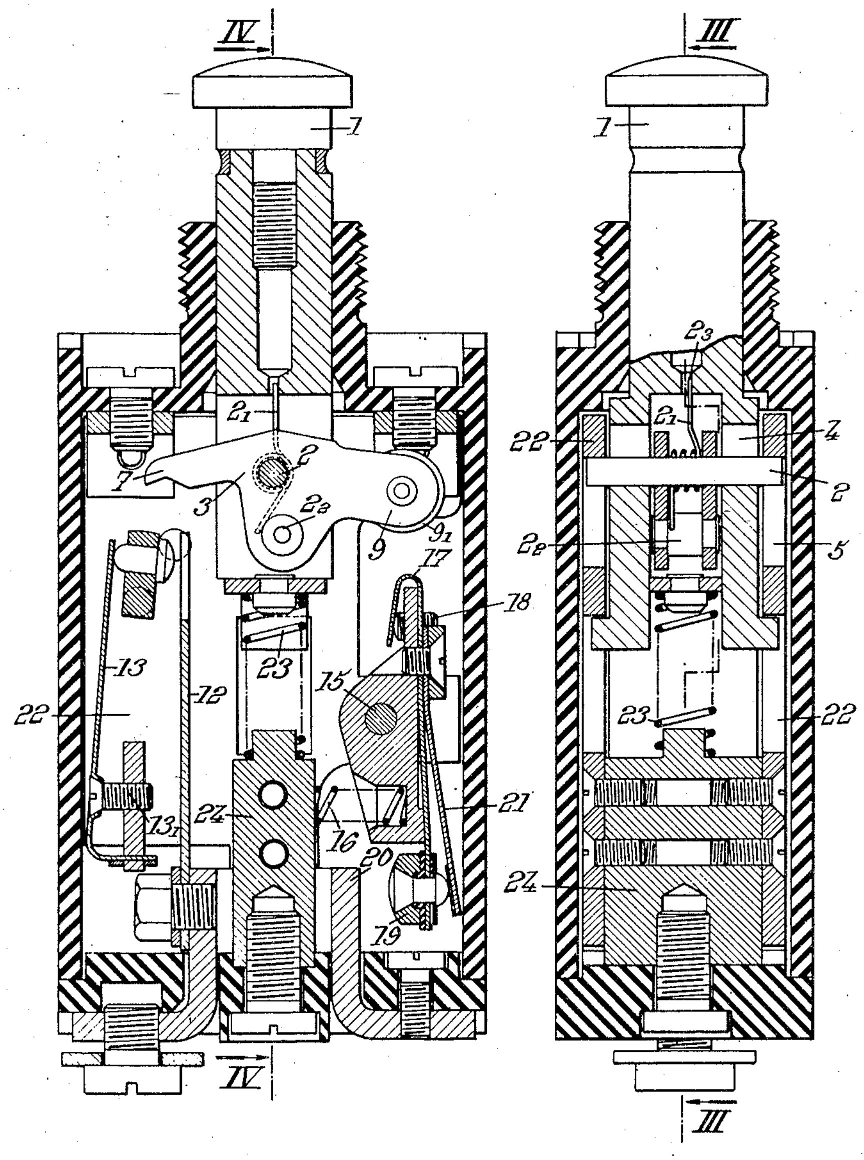
Figs. 3 and 4 show, respectively in section on the line III—III of Fig. 4 and in section on the line IV—IV of Fig. 3, a circuit-breaker made according to an embodiment of my invention, in a position corresponding to that illustrated by Fig. 1.

The operation of such an apparatus is as follows:

The initial state of the apparatus is supposed to be as shown by Figs. 1, 3 and 4 where current is cut off through the circuit.

It should be noted that Fig. 1 indicates the position of the parts of the apparatus just when said apparatus has been tripped open, whereas on Figs. 3 and 4, the abutment member 8 has already been able to return to its position of rest.

The apparatus will be supposed to be vertical.

In the circuit opening position, push-button 1 is in its upper position and the axle 2 of lever 3 is located at the top of the fixed groove 5.

Push-button 1 is gradually depressed against the action of spring 23.

This movement is transmitted to axle 2 about the axis of which lever 3 can pivot freely until its nose 7 comes into contact with the round surface of the abutment member 8.

When push-button 1 is further moved down, lever 3 is compelled to pivot about its axis and therefore to push back, due to the contact of roller $9_1$ with plate 17, the upper arm of lever 10.

Figures 5, 6:
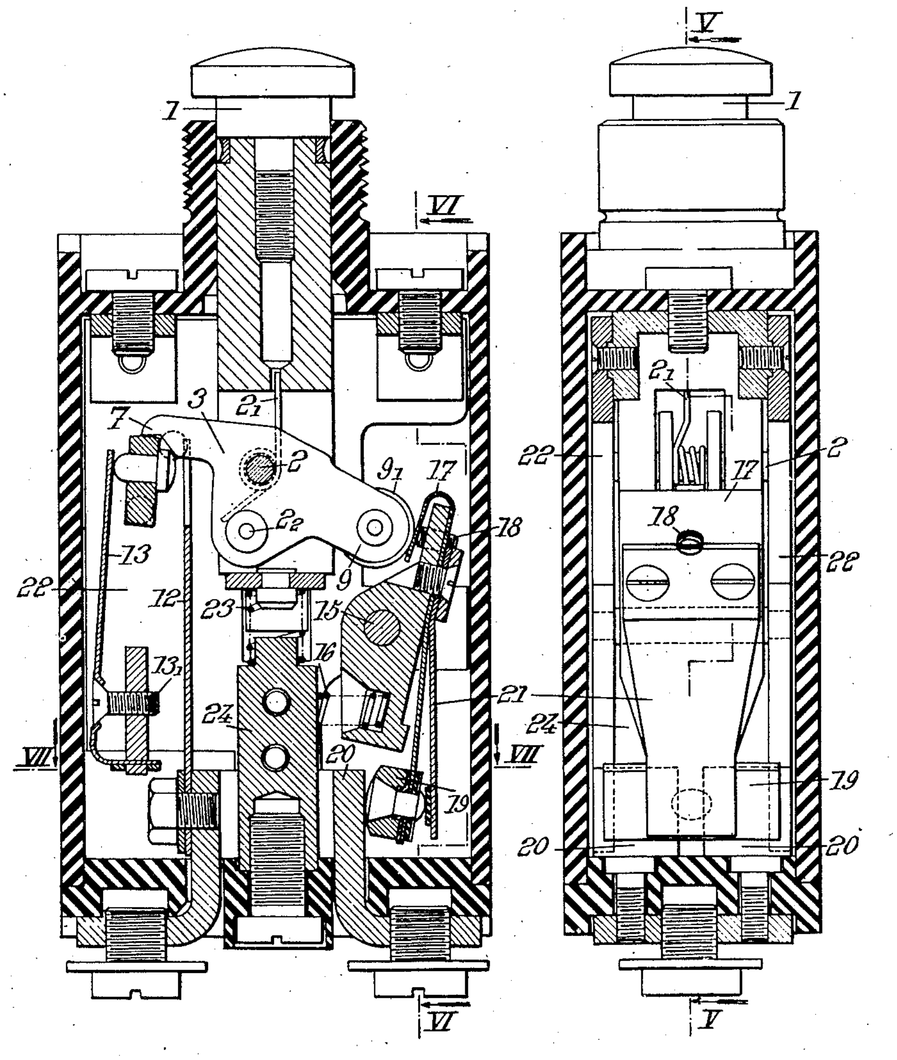
Figs. 5 and 6 show, respectively in section on the line V—V of Fig. 6 and in section on the line VI—VI of Fig. 5, the same circuit-breaker in reset position, corresponding to that illustrated by Fig. 2.

Return spring 16, which is acting upon lever 10, then exerts upon lever 3 an effort capable of inserting and keeping its axle 2 into the notch 6 of groove 5 as soon as push-button 1 has been moved down a sufficient distance. The circuit-breaker is then reset (Figs. 3, 5 and 6).

The elements are dimensioned so that roller $9_1$ has then pivoted lever 10 sufficiently to apply movable contacts 19 resiliently against fixed contacts 20.

The force F resulting from the coaction of plate 16 with roller $9_1$ (Fig. 2) may be decomposed into two forces one of which $F_1$, of relatively high value, passes through the pivot axis of lever 3 and the other of which, $F_2$, of very small intensity and perpendicular to $F_1$, is adjustable and may be reduced to zero by modification of the inclination of plate 17, in particular by means of screw 18.

The value of this force $F_2$ is adjusted so that tripping of the circuit-breaker takes place sufficiently sharply.

The axle 2 of lever 3 having thus been engaged, the pressure exerted on push-button 1 may be released, said button remaining in the depressed position.

If, subsequently, the current in the circuit exceeds the predetermined value for which the apparatus is adjusted, bimetallic strip 12 is deformed and exerts on abutment member 8 a force opposed to that of spring 13. As the pressure exerted by nose 7 on said abutment member is small and the surface of contact between these elements is such that there is but little friction (which makes the apparatus sensitive), said member can easily pivot about its axis 11 under the effect of the small difference between the forces acting thereon.

As soon as there is no longer contact between said member 8 and nose 7, lever 3 turns under the combined effects of adjustable force $F_2$, of spring $2_1$ and possibly of a difference between the weights of the respective branches of lever 3 on the opposed sides of the pivot axis thereof.

Figure 2:
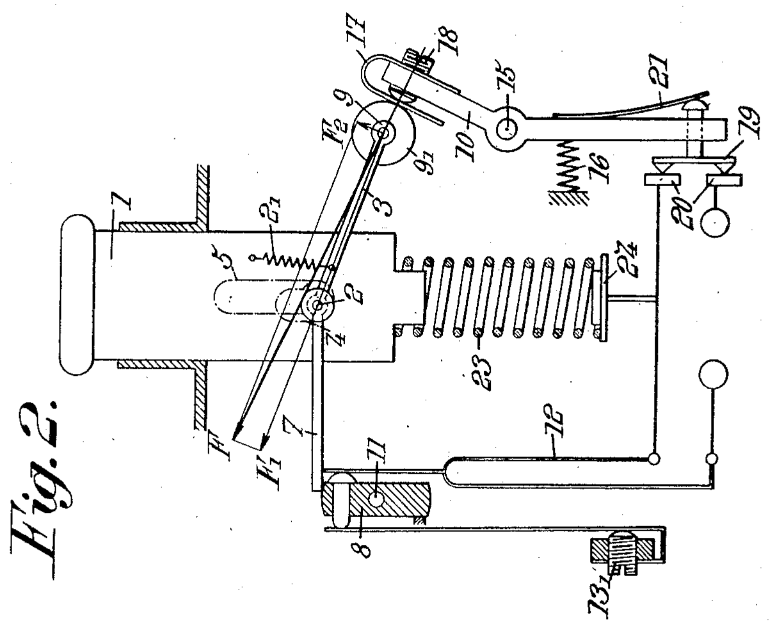
Fig. 2 is a view similar to Fig. 1 showing the circuit-breaker after resetting thereof.

This pivoting of lever 3 causes it to break its mechanical contact with lever 10. The action of return spring 16 on said lever 10 then cuts off the electric contacts and, on the other hand, as the axle 2 of lever 3 is no longer applied against the bottom of notch 6, it can be moved by spring 23 in groove 5, this movement being transmitted to push-button 1. The apparatus has thus tripped into circuit opening position (Fig. 2).

If the current in the circuit is above a predetermined limit, abutment member 8 is automatically retracted, which compels lever 3, subjected to the above mentioned forces, to pivot and to cut off the electric contacts, whatever be the distance to which button 1 has been depressed and even if the operator keeps his finger applied on said button, since, as above stated, the force thus exerted on button 1 is exerted exclusively upon the pivot axis of lever 3 and does not prevent said lever from oscillating about said axis.

This particularly easy free release is an interesting feature of my invention.

On the other hand, tripping of the circuit-breaker into open position may be obtained manually by pulling button 1 upwardly so as to disengage axle 2 from notch 6 and to compel lever 3 to release lever 10 without abutment member 8 having to be displaced.

In particular, the critical value of the current flowing through the circuit for which the apparatus is to trip open is adjusted by acting upon the force of spring 13 by means of screw $13_1$. The sharpness of the tripping operation may be adjusted by modifying the angular position of plates 17 by means of screw 18.

Figs. 8 to 11 and also Figs. 15 and 19 show various embodiments of the abutment member 8 which is: either mounted directly upon a spring plate 13 (Fig. 8) or on the bimetallic strip 12 which itself constitutes a spring 13 (Fig. 9); or pivotally mounted about a fixed axis 11 (Figs. 10, 11, 15 and 19), spring 13 being preferably applied upon a rounded portion 25 of this abutment member.

Spring 13 is for instance a plate spring (Figs. 10, 11 and 15), or a torsional helical spring (Fig. 19).

Adjustment of the efforts exerted upon abutment 8 is preferably obtained, when said abutment is pivotally mounted, by means of a screw $12_1$ acting directly upon the inclination of bimetallic strip 12, or simultaneously by means of a screw such as $12_1$ acting upon bimetallic strip 12 and of a screw such as $13_1$ acting upon spring 13 (see for instance Figs. 18 and 20).

Contact between abutment 8 and bimetallic strip 12 is effected by means of a part made of insulating material such as a bead of steatite 26 (Figs. 8, 10 and 11) or a glass ball 27 (Fig. 15).

According to an advantageous modification, abutment 8 is made of two disymmetrical portions, one $8_1$ (Figs. 19 and 20), made of metal, capable of acting efficiently as an abutment for the nose 7 of lever 3 and the other $8_2$, made of an insulating material on which spring 13 and bimetallic strip 12 can be applied directly.

In order to obtain that under the effect of the excess of current to which it is subjected, the bimetallic strip is sufficiently deformed, it may be constituted by juxtaposing several bimetallic strips connected either in series or in parallel (Fig. 15) or, preferably, by a single sufficiently long bimetallic strip (Fig. 19) on which can be mounted in parallel shunts $12_3$ of shapes and/or dimensions variable with the intensities for which tripping of the apparatus is desired.

Figs. 12 to 14 and also Figs. 15 and 19 show various embodiments of the contact carrying lever 10 for which:

Spring 16 is constituted by a helical spring (Fig. 12), a plate spring (Figs. 13 and 14) or a torsional spring (Figs. 15 and 19), in particular such as hereinafter described;

Spring 21 (which applies the movable contacts 19 against fixed contacts 20) is constituted by a spring plate (Figs. 12 and 13) one end of which is fixed on lever 10 and the other end of which carries the movable contacts 19, said spring 21 bearing against a rigid extension $10_1$ of lever 10; or said spring is a torsional spring (Figs. 14, 15 and 19).

A particularly advantageous construction of these springs 16 and 21 consists in constituting both of them by a single double torsional spring (Figs. 15 and 19), for instance made of stainless piano string, consisting of two identical halves coaxial to each other and the contiguous ends of which are joined so as to constitute spring 16 the end portions thereof constituting the spring 21.

Another interesting characteristic of the invention, illustrated by Figs. 14, 15 and 17, consists in mounting part $19_1$, which is rigid with the movable contacts 19, in such manner that it can move in all directions with respect to lever 10 and thus suitably distribute the pressure of movable contacts 19 on the corresponding fixed contacts 20.

For this purpose, I provide for instance in part $19_1$ an orifice 28 (Fig. 14) which is for instance of square or rectangular outline, in which a finger 29 rigid with lever 10 is engaged with some play. Part $19_1$ is then made to pivot about the shoulder $29_1$ of this finger when contacts 19 are applied against contacts 20, against the action of spring 21. The point of pivoting of the movable contact being thus close to said contact, I thus obtain a better rolling displacement thereof.

I may also provide an aperture 30 in a molded piece constituting lever 10 (Fig. 15) and part $19_1$ is provided with a bracing part 31 (Figs. 15 and 17) including a convex portion $31_1$ which engages into aperture 30, so as to permit all angular displacements of part $19_1$ with respect to lever 10.

It should be noted that, in the construction of Fig. 15, torsional spring 16—21 is insulated from contacts 19 on which it is applied by means of insulating lugs 32 pivotally mounted on axis 15, whereas in the construction of Fig. 19, said spring is insulated from the central terminal 24 by means of an insulating plate $24_1$ riveted thereon.

It should also be noted that the edges of the metal side plates 33 act as abutments for lever 10 in the embodiment of Figs. 15 and 16.

Some other constructional details may be considered, such as the following ones:

The part 34 which controls the displacements of the axle 2 of lever 3 may be screwed in push-button 1 (Fig. 15) or inversely, and the whole may be mounted slidable in a metallic sheath 35.

The casing of the apparatus may be made of a single molded piece 36 (Fig. 15) adapted to fit on a base 37; or it may include a cover 38 (Figs. 19, 22 and 23) fixed on the mechanism by means of nuts 39 (Figs. 22 and 23) adapted to fit on bolts 40 caught in this mechanism, these nuts being for instance disposed at two opposite corners of cover 38 and covered with a protection varnish 41.

The walls of said casing may advantageously be established by cutting tubular elements of suitable length from a continuous tube of rectangular cross-section, for instance made of a polyester resin reinforced by means of a glass fabric.

The central terminal 24 may be fixed by means of screws on the base 37 instead of being caught in this base by molding (Fig. 15).

The terminals (for instance those of the bimetallic strip) may be fixed by screws 42 the head of which is located inside the casing (Fig. 19).

Spring 23 which urges the push-button 1 upwardly, instead of being located between part 34 and the central terminal 24, may advantageously be housed in an annular jacket 43, preferably metallic, mounted around said push-button.

The transverse groove 4 (Fig. 1) rigid with the push-button 1 and the cooperation of which with fixed groove 5 permits of imparting the desired displacements to axle 2 may, instead of being constituted by a groove formed in part 34, be merely formed by the recess common to said fixed groove 5 and to the hollow portion of a kind of hook 44 (Fig. 19) forming an extension of said part 34 at its lower end, when said push-button is suitably depressed.

Instead of causing axle 2 to slide directly in the fixed groove 5, I may interpose between these two pieces rollers 45 (Fig. 19), for instance of brass or of stainless steel, so as to reduce wear and tear.

In order to avoid damage of the contacts due to the sparks that are produced when the apparatus is working, it is advantageous to make these contacts in such manner as to prevent the formation of such sparks (Figs. 24 to 26).

For this purpose, every movable contact 19 and every fixed contact 20 are made to include a system of two elementary contacts, one made of silver ($\mathbf{19_1}$, $\mathbf{20_1}$) and the other of tungsten ($\mathbf{19_2}$, $\mathbf{20_2}$). I dispose these elementary contacts on at least some of which resilient means 46 are acting, in such manner that, in the state of rest, the silver elements are at a greater distance from one another than the tungsten elements are, the difference (or play *j*) between these intervals being for instance of about 0.5 mm.

In the embodiment illustrated on the drawings, the elementary tungsten fixed contact $\mathbf{20_2}$ is fixed on one side of the silver fixed contact $\mathbf{20_1}$ and projects therefrom by about 0.5 mm. The whole of the movable contacts is mounted in accordance with the principle applied in the construction of Fig. 14. Thus it may move about an axis 46 which is rigid with respect to a stirrup-shaped member 47 which itself rotates about axis 15 together with a piece 48 including the above mentioned oblique surface 17. The whole of part 47 and piece 48, assembled together by means of a pin 49, constitutes the above cited lever 10, axis 46 playing the same part as finger 29 (Fig. 14). In this case, spring 16 is a double torsional spring the curved ends 50 of which are engaged in the side plates of the apparatus, wound on insulating rings 51 on either side of piece 48, and spring 21 is constituted by the combination of a spring and a counter-spring both of flap shape ($\mathbf{21_1}$ and $\mathbf{21_2}$) applied against each other and riveted together on part 47 by means of a rivet 52. Spring $\mathbf{21_1}$ is established in such manner as to exert a stronger pressure upon the silver contact element $\mathbf{19_1}$ than upon the tungsten contact element $\mathbf{19_2}$, for instance due to its shape, the distance *a* (Fig. 26) separating the area of contact between spring $\mathbf{21_1}$ and counter-spring $\mathbf{21_2}$ from the point of application of spring $\mathbf{21_1}$ against the silver contact element $\mathbf{19_1}$ (which is mounted without play upon axis 46) being smaller than that of *b* existing between said zone and the point of application of said spring against the tungsten contact element $\mathbf{19_2}$ (which is mounted with a play *j* upon axis 46).

At rest, the surfaces of these two contact elements are therefore in line with each other.

The operation of these contacts is as follows:

When the circuit-breaker is to be reset, contact is produced first upon tungsten contact elements $\mathbf{19_2}$ and $\mathbf{20_2}$. Then axis 46 which is mounted with some play in the tungsten contact element keeps moving and ensures contact between the silver elements.

When the circuit-breaker is tripped open, the silver elements are first moved away from each other, then the tungsten elements, in view of the fact that the shaft 46 drives first the silver contact as it is catching up the play provided in the tungsten contact element.

Owing to this arrangement, the contact elements are not deteriorated by sparks.

On Figs. 27 to 30 I have shown embodiments of a mechanism for producing a sudden engagement of the contacts.

In each of these constructions, part 34 is connected with the push-button 1 by means of a pin 53 caught in said button 1 and extending through an elongated aperture 54 of said part 34. As in the construction of Fig. 13, spring 23 which bears on the one hand upon push-button 1 and on the other hand upon the casing, is housed in a jacket 43 rigid with said casing. Another spring 55, of a pitch inverse of that of spring 23, bears on the one hand upon button 1 and on the other hand upon member 34. Said last mentioned member is provided with side bosses 56 which limit at one of their ends recesses 57 in which may be engaged elements 58 laterally urged by resilient means 59.

On Figs. 27 and 28, elements 58 are rollers and means 59 consist of a flat spring screwed on the frame of the apparatus between a screw head 60 and a spacing ring 61 serving to increase the flexibility of said spring.

On Fig. 29, elements 58 are balls and means 59 are constituted by helical compression springs.

The operation of these mechanisms is as follows:

When push-piece 1 is depressed, spring 23, which is weaker than spring 55, is compressed and member 34 is driven until bosses 56 come into contact with elements 58. Both of the springs 23 and 55 are then compressed together.

When these two springs are sufficiently compressed, or preferably when the lower face 62 of push-piece 1 has come to bear upon the upper face 63 of member 34, a further downward movement of push-button 1 compels member 34 to move on while pushing laterally the elements 58, which preferably roll upon a portion of these bosses which is given a suitable shape for this purpose.

Spring 55 then expands suddenly while rushing the member 34 toward the contact closing position.

Another way of obtaining a sudden closing of the contact consists in giving inclined surface 17 a shape such that, when it is attacked by roller $\mathbf{9_1}$, the angle *c* between the lines extending between the point of attack 64 on the respective pivot axes of the roller and of surface 17 is close to 180°.

It is then necessary, in order to cause roller $\mathbf{9_1}$ to move beyond this point 64, to exert a relatively great force with respect to the total force necessary for engaging the contact, and this effort causes a sudden pivoting of part 17 as soon as this point of resistance has been passed.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A circuit-breaker which comprises, in combination, a frame, two fixed contacts insulated from each other carried by said frame, a switching part movably carried by said frame, two movable contacts, electrically connected to each other, carried by said part arranged, to be applied, for one position of said part in said frame, against said fixed contacts respectively for electrically interconnecting them, a lever having a pivot axle movably guided in said frame with a translatory movement transverse to said pivot axle, said lever being freely pivotable with respect to said frame about the axis of said pivot axle, a control member operatively connected with said lever pivot axle for imparting thereto said translatory movement in one direction, resilient means interposed between said control member and said frame for opposing movement of said member in said direction, abutment means carried by said frame adapted to cooperate with said lever for causing it to pivot about the axis of said pivot axle when said pivot axle is moved in said direction by said control member, means carried by said lever for engaging said switching part when said lever is thus pivoted and then moving said part into the above mentioned position thereof, whereby said fixed contacts are interconnected, and means carried by said frame and electrically inserted between said two fixed contacts, said means being responsive to variations of the electric current flowing between said contacts, for retracting said abutment means from the path of said lever when said current rises in excess of a predetermined value, whereby, in this case, said switching part is not held in said above mentioned position thereof.

2. An apparatus according to claim 1 in which said control member and said frame are provided with two grooves for guiding said lever pivot axle, the groove provided in said control member extending transversely to the direction of displacement of said control member, the groove provided in said frame having a width substantially equal to the diameter of said pivot axle and extending in said direction of displacement, the end of said last mentioned groove toward which said axle is moved when said lever is displaced by said control member forming a notch at right angles to said direction for accommodating said axle in order to hold it in the position for which the contacts are closed when the current is normal.

3. An apparatus according to claim 2 in which said first mentioned groove includes an extension in the direction of movement of said control member.

4. A circuit-breaker which comprises, in combination, a frame, two fixed contacts insulated from each other carried by said frame, a switching lever pivotally mounted on said frame, two movable contacts, electrically connected to each other, carried by said lever arranged, to be applied, for one position of said lever in said frame, against said fixed contacts respectively for electrically interconnecting them, a lever having a pivot axle parallel to the pivot axis of said first mentioned lever, said pivot axle being movably guided in said frame with a translatory movement transverse to said pivot axis, said lever being freely pivotable with respect to said frame about the axis of said pivot axle, a control member operatively connected with said lever pivot axle for imparting thereto said translatory movement in one direction, resilient means interposed between said control member and said frame for opposing movement of said member in said direction, abutment means carried by said frame adapted to cooperate with said second mentioned lever for causing it to pivot about the axis of said pivot axle when said pivot axle is moved in said direction by said control member, means carried by said second mentioned lever for engaging said switching lever when said second mentioned lever is thus pivoted and then moving said switching lever into the above mentioned position thereof, whereby said fixed contacts are interconnected, and means carried by said frame and electrically inserted between said two fixed contacts, said means being responsive to variations of the electric current flowing between said contacts, for retracting said abutment means from the path of said second mentioned lever when said current rises in excess of a predetermined value, whereby, in this case, said switching lever is not held in said above mentioned position thereof.

5. An apparatus according to claim 4 in which said two movable contacts are resiliently mounted on said switching lever so as to be movable to a limited degree with respect thereto in all directions.

6. An apparatus according to claim 1 in which each of said contacts includes two contact elements disposed side by side and made of different materials, the contact element of one material of one movable contact being arranged to cooperate with the contact element of the same material of the corresponding fixed contact and at least one contact of each pair of cooperating contacts having its elements resiliently mounted so that the two elements of one material separate from each other, when the contacts are moved away from each other, before the two elements of the other material separate from each other.

7. An apparatus according to claim 6 in which one of said materials is silver and the other tungsten.

8. An apparatus according to claim 1 further including a transmission member directly connected with said lever, resilient means interposed between said transmission member and said control member whereby movement of said control member is transmitted to said lever in a resilient fashion through said transmission member, and means for yieldingly preventing said transmission member from moving in response to the movements of said control member so that the movement of said transmission member which takes place when said last mentioned means have yielded is very sudden.

9. An apparatus according to claim 8 in which said yielding means are resiliently mounted rolling elements bearing against transverse surfaces of said transmission member.

References Cited in the file of this patent

UNITED STATES PATENTS

| | | |
|---|---|---|
| 2,287,875 | Grober | June 30, 1942 |
| 2,467,653 | Berthier | Apr. 19, 1949 |
| 2,613,296 | Wood | Oct. 7, 1952 |
| 2,686,241 | Straub et al. | Aug. 10, 1954 |
| 2,701,829 | Krieger | Feb. 8, 1955 |
| 2,768,262 | Allard | Oct. 23, 1956 |